United States Patent [19]

Sakamoto et al.

[11] Patent Number: 4,940,266

[45] Date of Patent: Jul. 10, 1990

[54] LATCH DEVICE FOR FOLDABLE BACKREST OF AUTOMOTIVE SEAT

[75] Inventors: Daishiro Sakamoto; Takayuki Mouri; Hisao Tamura, all of Kanagawa, Japan

[73] Assignee: Ikeda Bussan Co., Ltd., Ayase, Japan

[21] Appl. No.: 277,955

[22] Filed: Nov. 30, 1988

[30] Foreign Application Priority Data

Jan. 26, 1988 [JP] Japan .................. 63-8693[U]

[51] Int. Cl.⁵ .................. E05C 3/26; B60N 1/10
[52] U.S. Cl. .................. 292/227; 297/379; 292/DIG. 62; 292/DIG. 27
[58] Field of Search .......... 297/379; 292/216, 207, 292/DIG. 62, 336.3, 227, 226, 30, 41, 53, 86, 119, 127, 135, 174, 237, DIG. 27; 296/65.1

[56] References Cited

U.S. PATENT DOCUMENTS

| | | | |
|---|---|---|---|
| 3,848,909 | 11/1974 | Foley | 292/336.3 |
| 4,093,289 | 6/1978 | Inabayashi et al. | 292/336.3 |
| 4,637,648 | 1/1987 | Okino et al. | 297/379 X |
| 4,684,175 | 8/1987 | Trutter | 297/379 |
| 4,721,338 | 1/1988 | Kondo | 297/379 |
| 4,779,927 | 10/1988 | Trutter | 297/379 |
| 4,880,264 | 11/1989 | Yamazaki et al. | 292/226 |
| 4,881,767 | 11/1989 | Kondo | 292/226 X |

FOREIGN PATENT DOCUMENTS

| | | |
|---|---|---|
| 3505247 | 6/1986 | Fed. Rep. of Germany ...... 297/379 |
| 3702767 | 8/1988 | Fed. Rep. of Germany ...... 297/379 |
| 82638 | 7/1981 | Japan .................. 297/379 |
| 59-190635 | 12/1984 | Japan . |
| 57436 | 3/1986 | Japan .................. 297/379 |
| 46729 | 2/1987 | Japan .................. 297/379 |
| 46730 | 2/1987 | Japan .................. 297/379 |
| 908588 | 10/1962 | United Kingdom . |
| 954075 | 4/1964 | United Kingdom . |
| 970537 | 9/1964 | United Kingdom . |

*Primary Examiner*—Eric K. Nicholson
*Attorney, Agent, or Firm*—Foley & Lardner, Schwartz, Jeffery, Schwaab, Mack, Blumenthal & Evans

[57] ABSTRACT

Disclosed herein is a latch device for use in a foldable backrest of an automotive seat. The latch device comprises a striker secured to a fixed member other than the backrest; a base member secured to the backrest to move therewith; a latch member pivotally supported by the base member, the latch member being latchingly engageable with the striker when the backrest assumes a given raised position; biasing means for biasing the latch member in a direction to achieve a latched engagement between the latch member and the striker; a latch cancelling mechanism connected to the latch member for pivoting the latch member in a direction to release the striker when moved in a given direction; a one-way mechanism interposed between the latch cancelling mechanism and the latch member, the one way mechanism permitting only a transmission of movement from the latch cancelling mechanism to the latch member; and a stopper mechanism including a lever moved with the latch cancelling mechanism and stopper rod which is projectable into a position to interrupt the movement of the lever.

8 Claims, 3 Drawing Sheets

LATCH DEVICE FOR FOLDABLE BACKREST OF AUTOMOTIVE SEAT

BACKGROUND OF THE INVENTION

1. Field of the Invention

The present invention relates in general to latch devices, and particularly to latch devices of a type which latches a pivotal member. More specifically, the present invention is concerned with a latch device for latching a foldable backrest of an automotive seat which provides, when folded, a tunnel between a passenger room and a trunk room.

2. Description of the Prior Art

Hitherto, various latch devices of the above-mentioned type have been proposed and put into practical use particularly in the field of passenger cars.

In order to clarify the task of the present invention, one conventional latch device of such type will be outlined, which is disclosed in Japanese Utility Model First Provisional Publication No. 59-190635.

In the device of this publication, a striker is fixed to a vehicle body, and a hook latchingly engageable with the striker is mounted to a foldable backrest. A push button is mounted on the backrest to actuate the hook. A pull strap extends from the push button and is exposed to a passenger room. When the pull strap is pulled from the passenger room, the push button is moved and thus the hook is actuated to release the striker. A latch slider operable from a trunk room is incorporated with the push button to disable the same from moving. When the latch slider is in its operative position, the push button is not moved even when the pull strap is pulled. Thus, under this condition, the latched engagement between the hook and the striker is not cancelled.

However, due to its inherent construction, the above-mentioned latch device has the following drawbacks.

That is, it is very necessary to increase the mechanical strength of the push button and parts directly connected therewith and thus enlarge the size of them in order to stand against a marked stress applied thereto through the pull strap. In fact, when, for example, a child on a rear seat pulls the pull strap strongly just for fun, a marked stress is applied to the push button and the incorporated parts. As is known, increase in size and strength of the parts induces a bulky and high cost construction of the latch device.

SUMMARY OF THE INVENTION

It is therefore an object of the present invention to provide an improved latch device for a foldable backrest, which is free of the above-mentioned drawbacks.

According to the present invention, there is provided a latch device for use in a foldable backrest of an automotive seat. The latch device comprises a striker secured to a fixed member other than the backrest; a base member secured to the backrest to move therewith; a latch member pivotally supported by the base member, the latch member being latchingly engageable with the striker when the backrest assumes a given raised position; biasing means for biasing the latch member in a direction to achieve a latched engagement between the latch member and the striker; a latch cancelling mechanism connected to the latch member for pivoting the latch member in a direction to release the striker when moved in a given direction; a one-way mechanism interposed between the latch cancelling mechanism and the latch member, the one-way mechanism permitting only a transmission of movement from the latch cancelling mechanism to the latch member; and a stopper mechanism including a lever moved with the latch cancelling mechanism and a stopper rod which is projectable into a position to interrupt the movement of the lever.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 2:
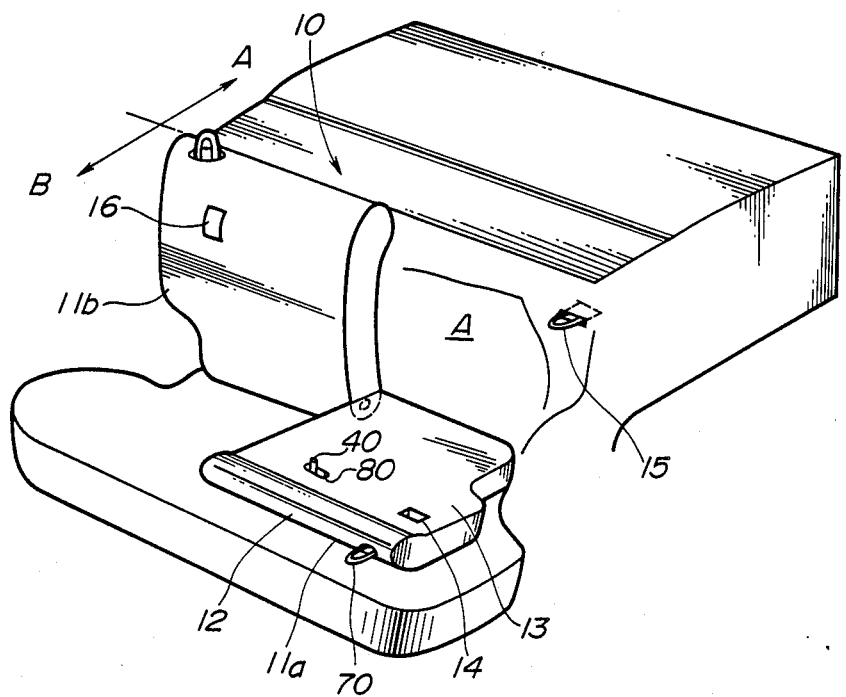
FIG. 2 is a perspective view of an automotive rear seat having foldable backrests each having the latch device of the present invention incorporated therewith.

Referring to FIG. 2, there is shown an automotive rear seat which comprises a seat cushion part and a seatback part 10. The seatback part 10 consists of two foldable backrests 11a and 11b. As shown, when the backrest 11a or 11b is folded forward, there is produced a tunnel through which a trunk room "A" is exposed to a passenger room "B". Although not shown in the drawing, a known hinge is arranged between a rear end of the seat cushion part and a lower portion of each backrest 11a or 11b to achieve the pivotal movement of the backrest relative to the seat cushion.

The backrests 11a and 11b are respectively equipped with the same latch devices according to the present invention. Thus, for ease of description, the following description is directed to only the latch device incorporated with the backrest 11a.

The latch device comprises a generally U-shaped striker 15 which is fixed to a front wall of the trunk room "A" in a manner to project toward the passenger room "B", as shown. The backrest 11a has at its back wall 13 a slot 14 into which the striker 15 is projected upon raising of the backrest 11a.

Figure 1:
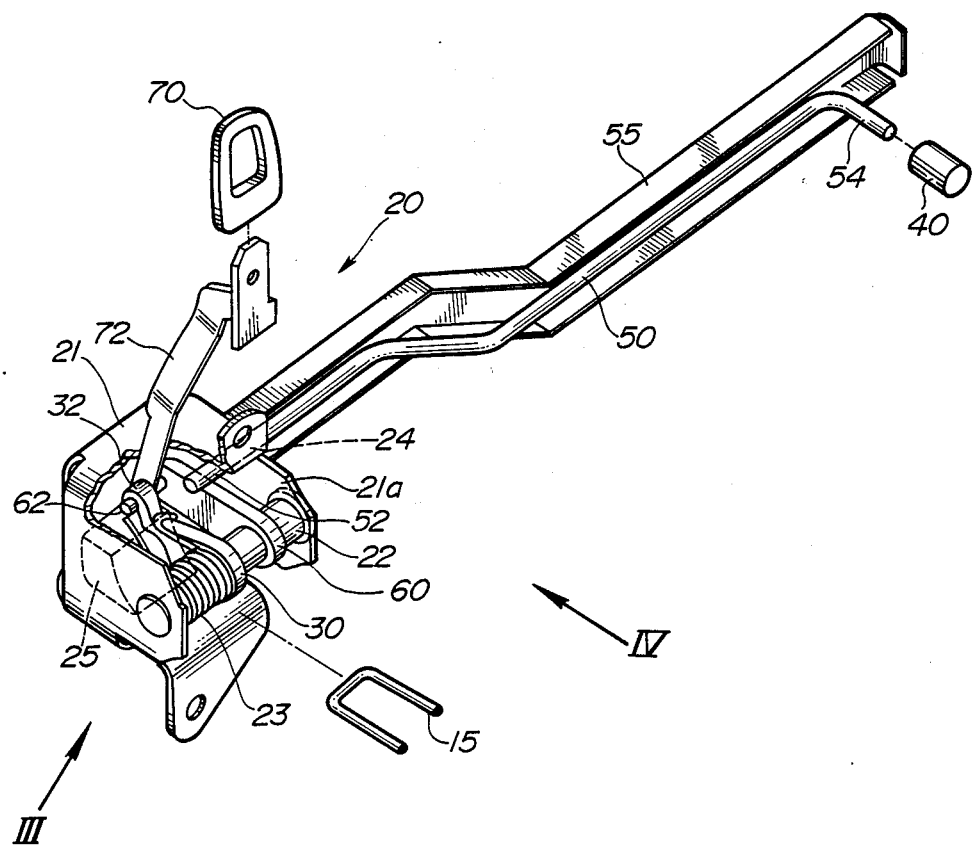
FIG. 1 is an exploded view of a latch device according to the present invention.

As will be understood from FIGS. 1 and 2, essential parts of the latch device are substantially entirely installed in the backrest 11a, which comprise a housing member 21 which is exposed to the slot 14. The housing member 21 carries a pivot shaft 22 about which a latch pawl 30 is pivotally mounted. The latch pawl 30 is latchingly engageable with the striker 15 upon raising of the backrest 11a. A coil spring 23 is disposed about the pivot shaft 22 to bias the latch pawl 30 in a counter-clockwise direction in FIGS. 1 and 3, that is, in a direction to achieve a latching engagement with the striker 15.

A bumper rubber 25 is installed in the housing member 21, against which the striker 15 bumps upon engagement with the latch pawl 30. As is seen from FIG. 3, when the striker 15 is latched by the latch pawl 30, the leading end of the striker 15 abuts against the bumper rubber 25 thereby to assure the latching engagement between the striker 15 and the latch pawl 30.

Figure 3:
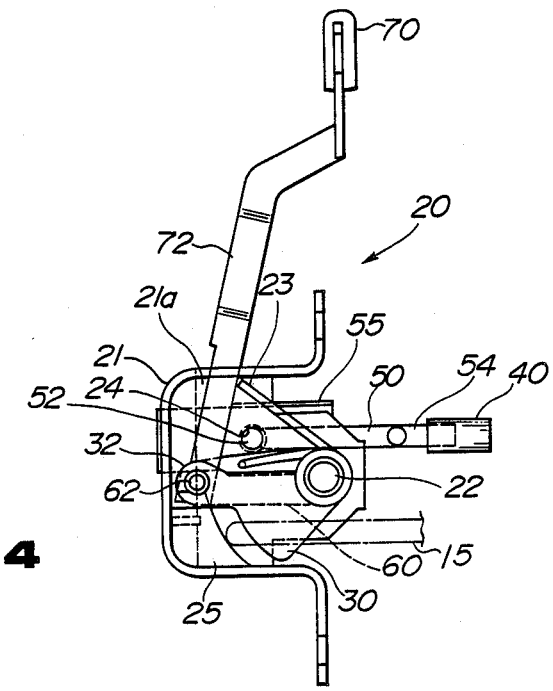
FIG. 3 is a view taken from the direction of the arrow "III" FIG. 1.

A lever 60 is pivotally disposed about the pivot shaft 22. As is seen from FIG. 1, a free end of the lever 60 is provided with a pin 62 which is detachably engaged with a recess formed in a projection 32 of the latch pawl 30. Due to the biasing force of the coil spring 23 applied to the latch pawl 30, the projection 32 is usually in engagement with the pin 62 so that upward movement of the pin 62 induces an upward movement of the projection 32. It is to be noted however that a clockwise movement of the latch pawl 30 as viewed in FIG. 1 against the force of the spring 23 is carried out freely with the projection 32 being disengaged from the pin 62. To the pin 62, there is pivotally connected a lower portion of a link member 72. The link member 72 has at its upper end a latch cancel knob 70 which is exposed to the passenger room "B" through an opening (no numeral) formed in a top 12 of the backrest 11a. Thus, when, with the latch pawl 30 assuming its latch position as shown in FIG. 3, the latch cancel knob 70 is pulled upward, the latch pawl 30 is pivoted about the pivot shaft 22 in a clockwise direction against the biasing force of the coil spring 23. With this, the latch pawl 30 comes to its unlatch position releasing the striker 15. It is to be noted that the clockwise pivoting of the latch pawl 30 is carried out together with a pivoting of the lever 60 about the pivot shaft 22 in the same direction.

As is best shown in FIG. 1, the housing member 21 has at one side wall 21a thereof an opening 24 through which a leading end portion 52 of a stopper rod 50 projects into the housing member 21. As is seen from FIG. 1, the leading end portion 52 of the stopper rod 50 is projectable to a position just above the lever 60. Under this condition, the lever 60 is prevented from pivoting in a clockwise direction. The stopper rod 50 extends horizontally from the housing member 21 and terminates at a bent end 54 to which a lock knob 40 is fixed. An elongate cover member 55 extends along the stopper rod 50 to cover the same. As will be seen from FIG. 2, the lock knob 40 is projected outward from the backrest 11a through an elongate slot 80 formed in the back wall 13 of the backrest 11a.

In the following, operation will be described with reference to the drawings.

For ease of understanding, the description will be commenced with respect to a condition wherein the backrest 11a assumes its normal or stand position. Under this condition, the latch pawl 30 latches the striker 15 in a manner as shown in FIG. 3, and the stopper rod 50 assumes its inoperative condition wherein the leading end 52 thereof is kept away from the lever 60 permitting pivoting movement of the same in a clockwise direction in FIG. 4.

When, for the purpose of folding the backrest 11a, the latch cancel knob 70 is pulled upward, the latch pawl 30 is pivoted to assume its unlatch position releasing the striker 15 for the reason which has been described hereinabove. Thus, the backrest 11a can be folded easily when pulled forward. For facilitating this folding, the backrest 11a is equipped with a pull strap 16 on a front side thereof. When the backrest 11a assumes the folded position as shown in FIG. 2, the trunk room "A" is exposed to the passenger room "B" through the tunnel defined behind the backrest 11a.

When then the backrest 11a is raised, the striker 15 projects into the slot 14 and pushes the latch pawl 30 against the force of the biasing spring 23 and finally comes into latching engagement with the latch pawl 30. Thus, latch device returns to the condition as shown in FIG. 3.

Figure 4:
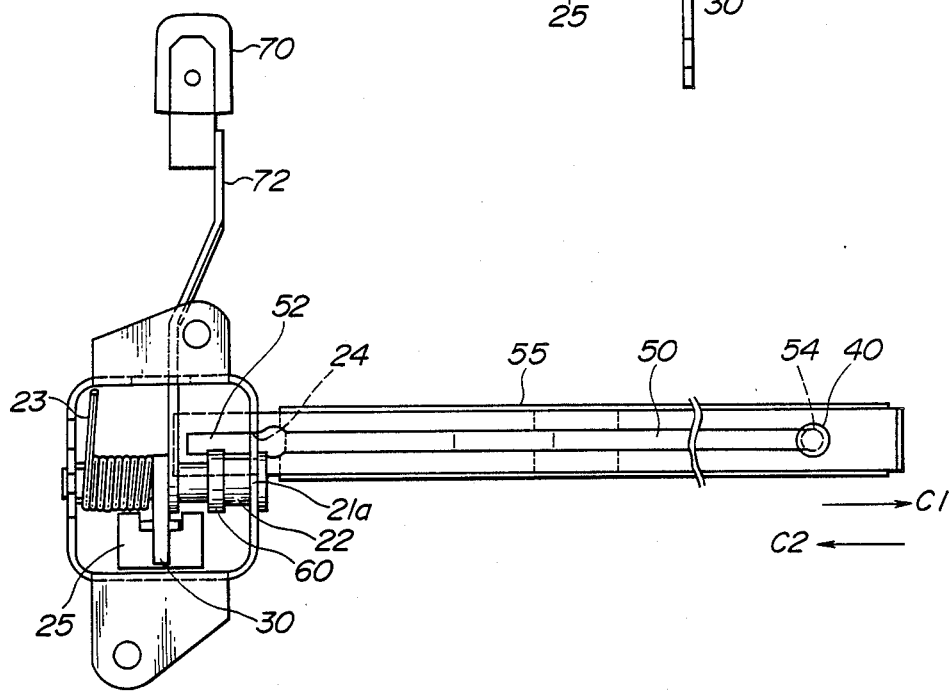
FIG. 4 is a view taken from the direction of the arrow "IV" of FIG. 1.

When now the lock knob 40 is manipulated from the trunk room "A" to move in a direction of the arrow "C2" in FIG. 4, the leading end 52 of the stopper rod 50 is projected to the position just above the lever 60 suppressing pivoting of the lever 60 in the latch cancelling direction. Thus, under this condition, the latch condition of the latch pawl 30 can not be cancelled even when the latch cancel knob 70 is pulled upward.

That is, when, under this locked condition of the backrest 11a, the latch cancel knob 70 is pulled upward, the lever 60 is brought into abutment with the leading end 52 of the stopper rod 50 preventing a pivoting of the latch pawl 30 in a so-called striker releasing direction.

When, with the backrest 11a assuming its folded position, the lock knob 40 is moved in the direction of the arrow "C2" in FIG. 4 and then the backrest 11a is raised, the striker 15 is thrust into the latch device 20 pushing the latch pawl 30 against the force of the coil spring 23 and finally latched by the latch pawl 30 as shown in FIG. 3. As has been mentioned hereinafore, during this operation, the latch pawl 30 is pivoted without being affected by the pin 62 (see FIG. 1).

When, with the backrest 11a assuming its raised and locked condition, the pull strap 16 is strongly pulled by, for example, a naughty boy, a big force thus generated is applied to the striker 15 through the latch pawl 30, not to the leading end 52 of the stopper rod 50. This means that the stopper rod 50 can be produced relatively small in size and light in weight. Thus, the latch device of the present invention can be constructed compact in size and light in weight.

What is claimed is:

1. In a foldable backrest of an automotive seat, a latch device which comprises:

a striker secured to a fixed member;

a base member secured to said backrest to move therewith;

a latch member pivotally supported by said base member, said latch member being latchingly engageable with said striker when said backrest assumes a given raised position;

biasing means for biasing said latch member in a direction to achieve a latched engagement between said latch member and said striker;

a latch cancelling mechanism operably connected to said latch member for pivoting said latch member in a direction to release said striker when moved in a given direction;

a one-way function mechanism interposed between said latch cancelling mechanism and said latch member, said one-way function mechanism permitting a latched engagement of said latch member with said striker without moving said latch cancelling mechanism in said given direction; and a stopper mechanism including a lever moved with said latch cancelling mechanism and a stopper rod which is projectable into a position to interrupt the movement of said lever;

wherein said one-way function mechanism comprises:

a pin secured to said lever to move therewith, said pin having said latch canceling mechanism connected thereto; and a projection formed on said latch member, said projection having a recess into which said pin is received.

2. A latch device as claimed in claim 1, in which said stopper rod is provided with a first knob which is exposed to the outside of said backrest through an opening formed in a back wall of said backrest.

3. A latch device as claimed in claim 2, in which said lever of said stopper mechanism is pivotally supported by a pivot shaft by which said latch member is pivotally supported.

4. A latch device as claimed in claim 3, in which said biasing means is a coil spring which is disposed about said pivot shaft.

5. In a foldable backrest of an automotive seat, a latch device which comprises:
- a striker secured to a fixed member other than said backrest;
- a base member secured to said backrest to move therewith;
- a latch member pivotally supported by said base member, said latch member being latchingly engageable with said striker when said backrest assumes a given raised position;
- biasing means for biasing said latch member in a direction to achieve a latched engagement between said latch member and said striker;
- a latch cancelling mechanism operably connected to said latch member for pivoting said latch member in a direction to release said striker when moved in a given direction;
- a one-way function mechanism interposed between said latch cancelling mechanism and said latch member, said one-way mechanism permitting a latch engagement of said latch member with said striker without moving said latch cancelling mechanism in said given direction; and
- a stopper mechanism including a lever moved with said latch cancelling mechanism and a stopper rod which is projectable into a position to interrupt the movement of said lever;
- wherein said stopper rod is provided with a first knob which is exposed to the outside of said backrest through an opening formed in a back wall of said backrest;
- said lever of said stopper mechanism is pivotally supported by a pivot shaft by which said latch member is pivotally supported;
- said biasing means is a coil spring which is disposed about said pivot shaft; and
- said one-way mechanism comprises a pin connected to said latch cancelling mechanism to move therewith and a projection formed on said latch member, said projection having a recess into which said pin is received.

6. A latch device as claimed in claim 5, in which said pin has said lever of said stopper mechanism connected thereto.

7. A latch device as claimed in claim 6, in which said latch cancelling mechanism comprises a link member carrying said pin and a second knob connected to a leading end of said link member and exposed to the outside of said backrest through an opening formed in said backrest.

8. A latch device as claimed in claim 1, further comprising a shock absorber which is mounted to said base member to damp a shock which is produced when said striker is brough into engagement with said latch member.

* * * * *